US011280360B2

(12) United States Patent
Williams

(10) Patent No.: US 11,280,360 B2
(45) Date of Patent: Mar. 22, 2022

(54) ASSEMBLY FOR LOCATING AND COUPLING COMPONENTS TOGETHER

(71) Applicant: Ian R Williams, Davisburg, MI (US)

(72) Inventor: Ian R Williams, Davisburg, MI (US)

(73) Assignee: FCA US LLC, Auburn Hills, MI (US)

( * ) Notice: Subject to any disclaimer, the term of this patent is extended or adjusted under 35 U.S.C. 154(b) by 183 days.

(21) Appl. No.: 16/590,433

(22) Filed: Oct. 2, 2019

(65) Prior Publication Data

US 2021/0102565 A1    Apr. 8, 2021

(51) Int. Cl.
*F16B 2/20* (2006.01)
*F16B 5/12* (2006.01)
*F16B 5/00* (2006.01)
*B60R 13/02* (2006.01)

(52) U.S. Cl.
CPC .............. *F16B 2/20* (2013.01); *F16B 5/002* (2013.01); *F16B 5/12* (2013.01); *B60R 13/0206* (2013.01)

(58) Field of Classification Search
CPC .... B27M 3/0066; B60R 13/0206; F16B 2/20; F16B 2/22; F16B 2/245; F16B 2/246; F16B 5/0012; F16B 5/0016; F16B 5/002; F16B 5/0614; F16B 5/12; F16B 5/121; Y10T 403/70; Y10T 403/7045; Y10T 403/7073; Y10T 403/7096; Y10T 403/73
USPC ......................... 403/345, 364, 375, 382, 403
See application file for complete search history.

(56) References Cited

U.S. PATENT DOCUMENTS

| | | | | |
|---|---|---|---|---|
| 4,591,090 A | * | 5/1986 | Collins | B65D 5/48038 217/32 |
| 4,685,609 A | * | 8/1987 | Ferrari | B65D 5/48038 229/120.36 |
| 5,518,171 A | * | 5/1996 | Moss | B65D 5/48038 229/120.36 |
| 5,533,237 A | * | 7/1996 | Higgins | F16B 5/065 24/289 |
| 5,797,236 A | * | 8/1998 | Posey, Jr | A45C 11/20 403/346 |
| 9,533,718 B2 | * | 1/2017 | Smith | F16B 2/22 |
| 9,841,041 B1 | * | 12/2017 | Santillan Gutierrez | F16B 2/22 |

(Continued)

FOREIGN PATENT DOCUMENTS

| | | | | |
|---|---|---|---|---|
| DE | 202016006446 U1 | * | 12/2016 | ............ F16B 5/0614 |
| GB | 2411707 A | * | 9/2005 | ............ F16B 5/0016 |
| GB | 2564102 A | * | 1/2019 | ............ F16B 5/0016 |

*Primary Examiner* — Josh Skroupa
(74) *Attorney, Agent, or Firm* — Ralph E. Smith

(57) ABSTRACT

An assembly for coupling a first component with a second component. The assembly may comprise first and second connectors respectively associated with the first and second components, a first biasing member carried by either the first or second connector, and a second biasing member also carried by either the first connector or the second connector. When mated together, the first and second connectors are biased in a first direction by the first biasing member thereby constraining relative movement between the connectors in the first direction. The connectors are also biased in a second direction by the second biasing member thereby constraining relative movement between the connectors in the second direction, wherein the second direction is oriented at a non-zero angle relative to the first direction. And the connectors are relatively slidable in a third direction different from the first and second directions.

20 Claims, 5 Drawing Sheets

(56) References Cited

U.S. PATENT DOCUMENTS

| | | | |
|---|---|---|---|
| 9,909,604 B1* | 3/2018 | Fawcett | F16B 12/125 |
| 9,914,408 B2* | 3/2018 | Dickinson | F16B 2/22 |
| 10,670,058 B2* | 6/2020 | Sugiyama | F16B 2/22 |
| 2012/0224917 A1* | 9/2012 | Bishop | F16B 5/0635 |
| | | | 403/375 |

* cited by examiner

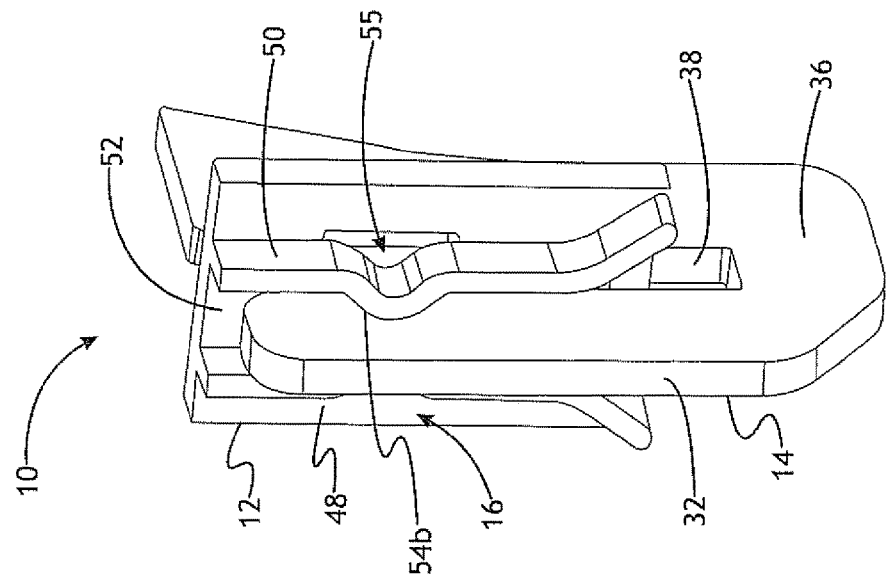
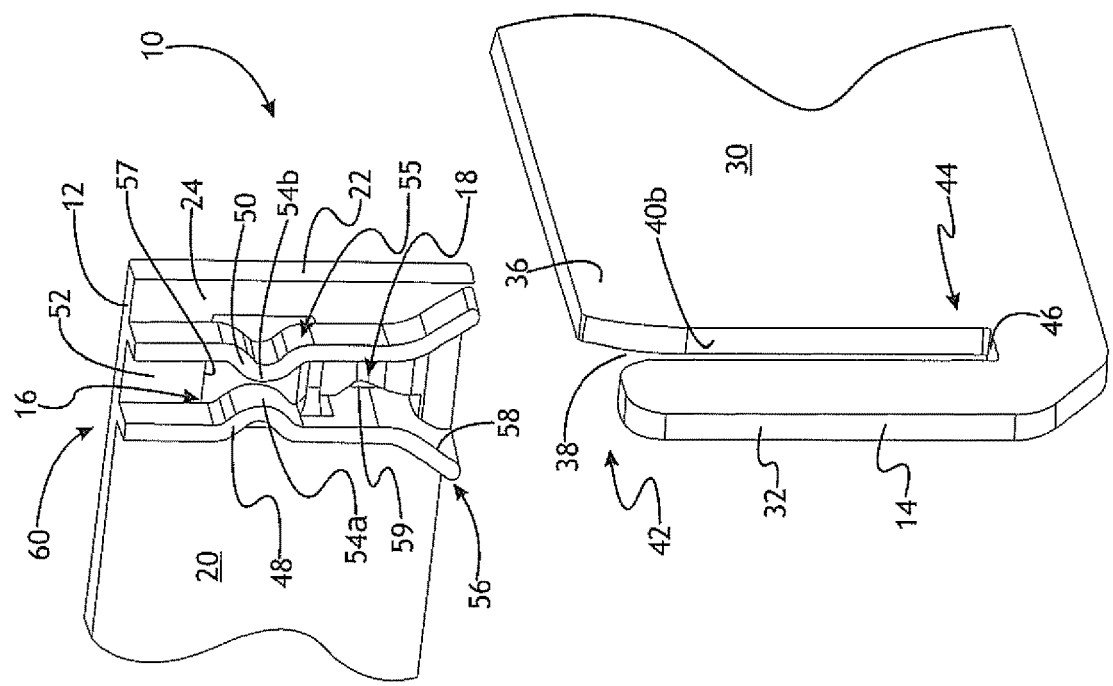

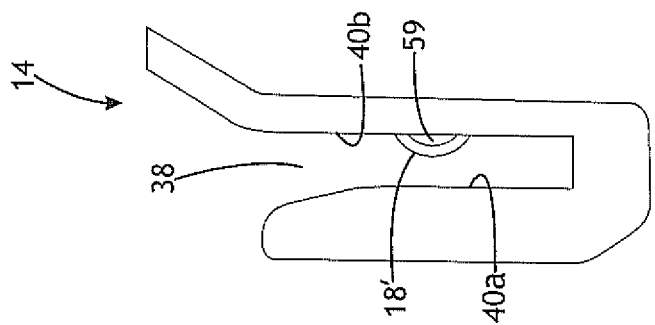
Fig.12
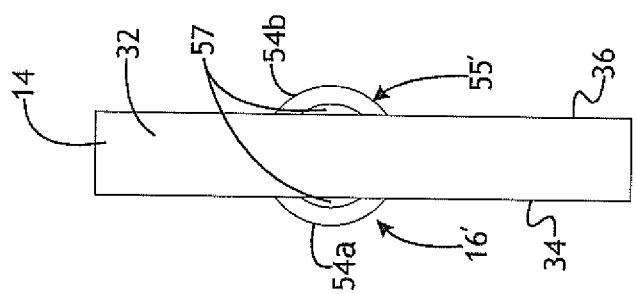
Fig.11
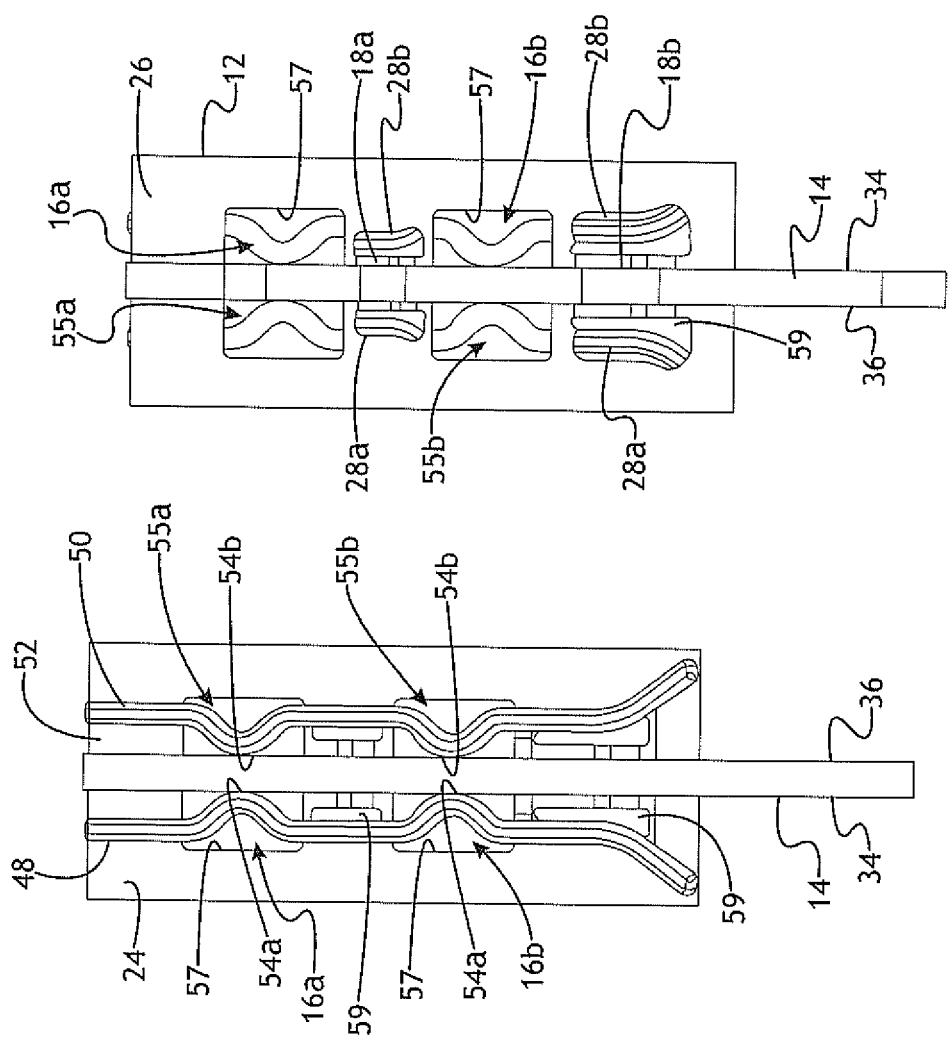
Fig.10
Fig.9

ASSEMBLY FOR LOCATING AND COUPLING COMPONENTS TOGETHER

FIELD

The present disclosure relates to assemblies for locating and coupling components together.

BACKGROUND

Automotive vehicles include an interior in which a plurality of individual components, for example, trim panels, instrument panels, and structural pillars or sub-assemblies thereof, are disposed and coupled together. In certain instances, these components may be coupled together by a combination of locator pins and tabs. Such conventional coupling arrangements, however, can produce buzz, squeak, and rattle (BSR) conditions that an end user may find to be undesirable. To mitigate the BSR conditions, flocked tape is often used, resulting in increased material and installation costs.

SUMMARY in at least some implementations, an assembly for coupling a first component with a second component comprises a first connector associated with the first component, a second connector associated with the second component and configured to be mated with the first connector, a first biasing member carried by the first connector or the second connector, and a second biasing member also carried by either the first connector or the second connector. The first connector has a body that includes a first face and a second face. The second connector has a body that includes a first face, a second face, and a slot disposed therein extending through the first and second faces and configured to receive at least a portion of the body of the first connector. The slot is defined by first and second spaced-apart sidewalls. When the first and second connectors are mated together, the first and second connectors are: biased in a first direction by the first biasing member thereby constraining relative movement between the first and second connectors in the first direction; biased in a second direction by the second biasing member thereby constraining relative movement between the first and second connectors in the second direction, wherein the second direction is oriented at a non-zero angle relative to the first directions; and relatively slidable in a third direction different from the first and second directions.

In at least some implementations, an assembly for coupling a first component with a second component comprises a first connector associated with the first component, a second connector associated with the second component and configured to be mated with the first connector, a first biasing member carried by the first connector or the second connector and comprising first and second biasing elements, and a second biasing member also carried by either the first connector or the second connector. The first connector has a body that includes a first face and a second face. The second connector has a body that includes a first face, a second face, and a slot disposed therein extending through the first and second faces and configured to receive at least a portion of the body of the first connector. The slot is defined by first and second spaced-apart sidewalls. When the first and second connectors are mated together, the first and second connectors are: biased in a first direction by the first biasing member thereby constraining relative movement between the first and second connectors in the first direction; biased in a second direction by the second biasing member thereby constraining relative movement between the first and second connectors in the second direction, wherein the second direction is substantially perpendicular to the first direction; relatively slidable in a third direction that is substantially parallel to both the first and second directions.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

BRIEF DESCRIPTION OF THE DRAWINGS

FIG. 1 is a perspective view of an assembly for coupling a first component with a second component, wherein the assembly is in a disassembled state.

FIG. 2 is a perspective view of the assembly illustrated in FIG. 1 in an assembled state.

FIG. 9 is front view of the assembly illustrated in FIGS. 7 and 8.

FIG. 10 is rear view of the assembly illustrated in FIGS. 7 and 8.

FIG. 11 is a front view of a component having at least one biasing member.

FIG. 12 is a side view of another component having at least one biasing member.

DETAILED DESCRIPTION

Figure 4:
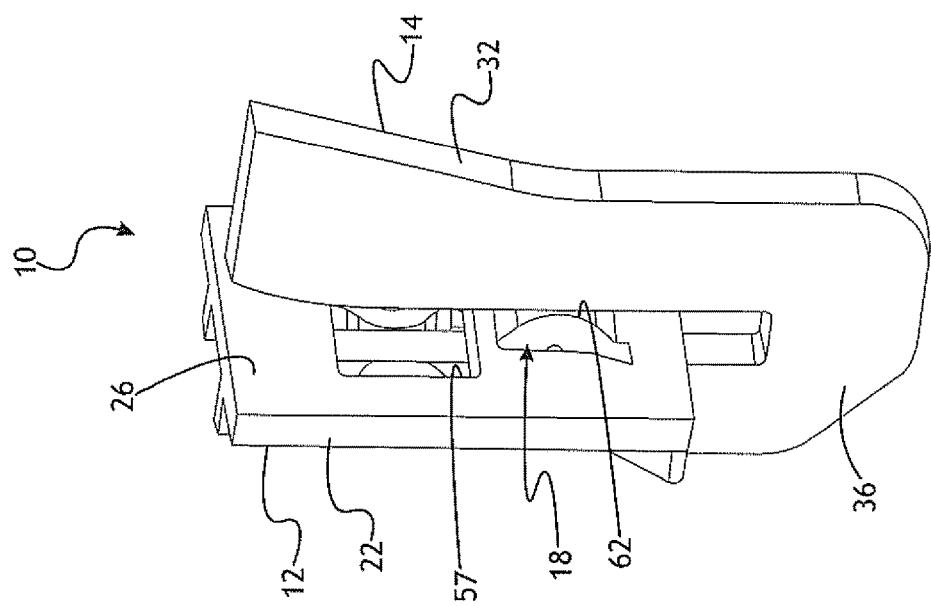
FIG. 4 is a perspective view of the assembly illustrated in FIG. 1 in an assembled state.
Figure 3:
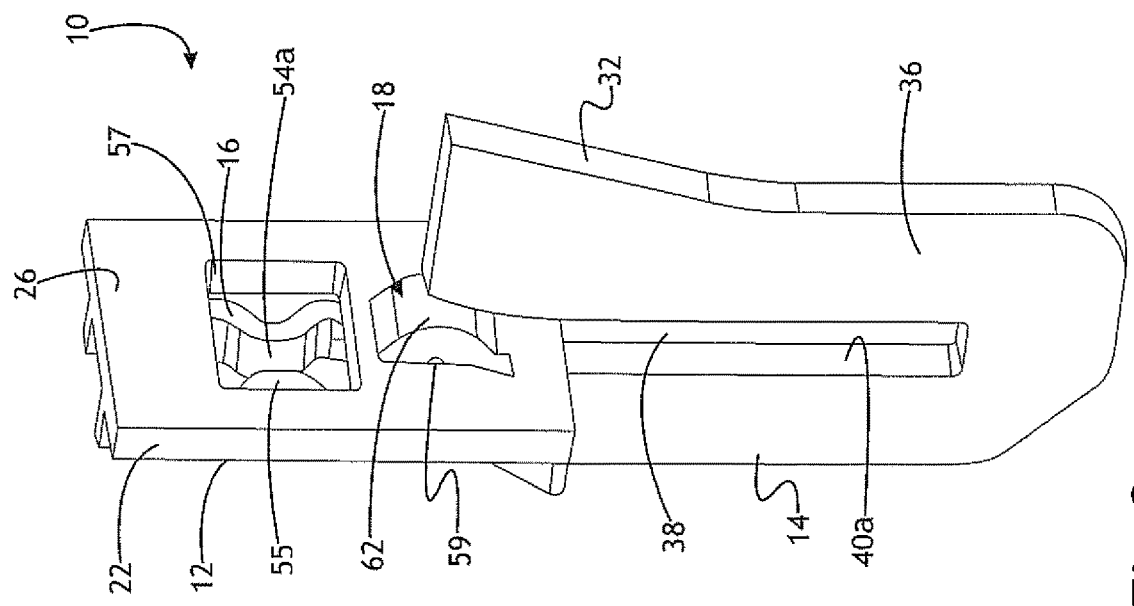
FIG. 3 is a perspective view of the assembly illustrated in FIG. 1 in a partially assembled state.

Referring in more detail to the drawings, FIG. 1 depicts an assembly 10 for locating and coupling a first component with a second component. The first component 20 and second component 30 can be any two components that are to be coupled together, and as such, the assembly 10 may find use in any number of applications. In one particular application, the first and second components comprise automotive components, such as, for example and without limitation, trim panels, instrument panels, and structural pillars or sub-assemblies thereof, that are to be disposed and coupled together within the interior of a vehicle. By way of example, the first component may comprise the A-pillar of a vehicle or a trim piece fixed to or covering part of the A-pillar and the second component may comprise an instrument panel of the vehicle. It will be appreciated, however, that the present disclosure is not intended to be limited to any particular component(s). In any event, in the illustrated embodiment, the assembly 10 includes a first connector 12, a second connector 14, a first resilient biasing member 16, and a second resilient biasing member 18 (best shown in FIGS. 3 and 4).

Figure 7:
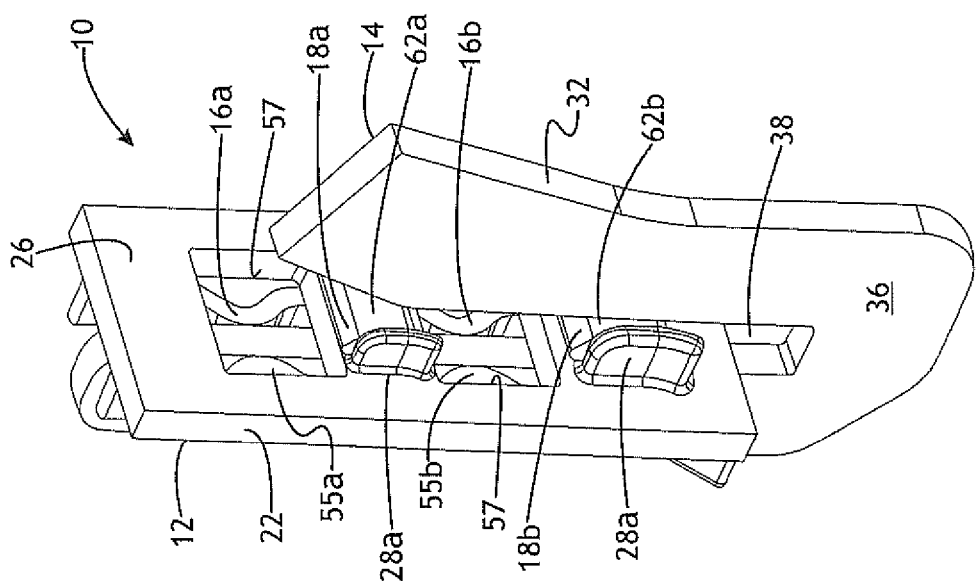
FIG. 7 is a perspective view of another embodiment of an assembly for coupling a first component with a second component wherein the assembly is in an assembled state.

The first connector 12 is associated with the first component 20 (FIG. 1) and is configured to be mated with the second connector 14 to couple the first and second components 20, 30 together. The first connector 12 has a body 22 that includes a first face 24 and a second face 26 (best shown in FIGS. 3 and 4) that, in the illustrated embodiment, face away from each other in opposite directions. In at least some embodiments such as that illustrated in FIGS. 7 and 10, the first connector 12 may also include a pair of guides or stops 28a, 28b extending outwardly from one of the faces 24, 26 (e.g., the second face 26 in FIGS. 7 and 10) and along a portion of the length of the body 22 of the connector 12. The guides 28a, 28b serve to maintain alignment between the first and second connectors 12, 14 when the connectors are being mated together and may also serve to constrain relative movement between the first and second components when the first and second connectors are mated together. In an embodiment, the first connector 12 is a molded component formed of plastic; though other suitable materials may certainly be used instead.

The second connector 14 is associated with the second component 30 and is configured to be mated with the first connector 12. Like the first connector 12, the second connector 14 has a body 32 that includes a first face 34 (best shown in FIG. 5) and a second face 36 that, in the illustrated embodiment, face away from each other in opposite directions. The body 32 also includes a slot 38 disposed therein extending through the first and second faces 34, 36 and configured to receive at least a portion of the body 22 of the first connector 12. In an embodiment, the slot 38 comprises and is defined by first and second spaced-apart sidewalls 40a, 40b. The slot 38 may further include an open end 42 and in at least some embodiments, a closed end 44 opposite the open end and defined by a base 46 extending between the first and second sidewalls 40a, 40b. In an embodiment, the second connector 14 is a molded component formed of plastic; though other suitable materials may certainly be used instead.

The first biasing member 16 may be carried by either the first connector 12 or the second connector 14. In the illustrated embodiment, the first connector 12 includes a first retainer 48 and a second retainer 50 both extending outwardly from the first face 24. As shown in FIG. 1, the first and second retainers 48, 50 are spaced apart from each other forming a channel 52 therebetween that is configured to receive and retain between them a portion of the body 32 of the second connector 14. In the illustrated embodiment, the retainers 48, 50 include or are adjacent to opposing biasing members that, as will be described more fully below, have engagement portions 54a, 54b that are configured to exert or apply a biasing force towards each other. In the embodiment illustrated in FIGS. 1 and 2, the first retainer 48 includes the first biasing member 16 which includes engagement portion 54a that is configured to engage and flex against one of the first and second faces 34, 36 of the body 32 of the second connector 14, and the second retainer 50 includes an oppositely arranged third biasing member 55 that is configured to engage and be biased against the other of the first and second faces 34, 36.

Figure 8:
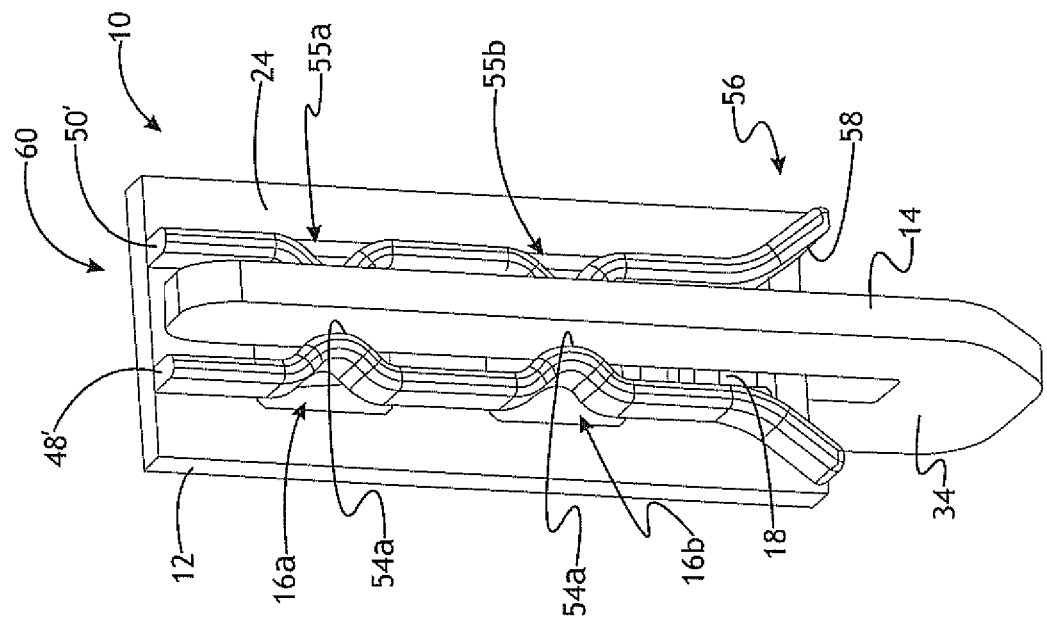
FIG. 8 is a perspective view of the assembly illustrated in FIG. 7.

Each of the retainer 48, 50 may have one or more engagement portions 54a, 54b that are configured to engage respective ones of the first and second faces 34, 36 of the body 32 of the second connector 14. For example, in the embodiment illustrated in FIGS. 1 and 2, each of the first and second retainers 48, 50 includes one engagement portion 54a, 54b. In the embodiment illustrated in FIGS. 8 and 9, however, each of the first and second retainers 48', 50' Includes two biasing members 16a, 16b and 55a, 55b, defined at least in part by associated voids 57 and thus provide a pair of engagement portions 54a, 54b. Accordingly, it will be appreciated that each of the first and second retainer 48, 50 may include one or multiple engagement portions 54, and that the retainers 48, 50 need not have the same number of engagement portions 54 (e.g. retainer 48 may have more or fewer engagement portions 54 than does retainer 50).

Regardless of the number of engagement portions 54 the first and second retainers 48, 50 may have, that or those engagement portions may have a number of shapes and configurations. In at least some implementations, the biasing members 16, 55 are arranged to flex or move relative to the remainder of the retainers 48, 50. In the illustrated embodiment, the biasing members 16, 55 overlie and may be defined in part by a void 57 in the first connector body 22 such that the biasing members 16, 55 are each connected at opposed ends to the remainder of their respective one of the retainers 48, 50, but at least a portion of each of the biasing members 16, 55 is defined in part by the void 57 or is otherwise not directly coupled to the face 24 of the body 22, and is thus somewhat free to flex relative to the remainder of the body 22. In the illustrated embodiment, each of the engagement portions 54 is radiused or inwardly curved or bowed so as to allow a certain type and amount of relative movement between the first and second components 20, 30 and the first and first and second connectors 12, 14 when the first and second connectors 12, 14 are mated together. It will be appreciated, however, that other or additional suitable shapes and configurations may be used instead.

As shown in, for example, FIGS. 1 and 2 and FIGS. 8 and 9, the channel 52 between the first and second retainers 48, 50 may have a width that varies along its length. For example, in the illustrated embodiment, the maximum width of the channel 52 is at a first end 56 thereof that forms an opening 58 to the channel 52 that serves a locating function when the first and second connectors 12, 14 are being mated together. In an embodiment, the width of the channel 52 progressively narrows as the channel extends from the first end 56 toward a second end 60 that is remote from the first end 56. The minimum width of the channel 52 is between corresponding engagement portions 54a, 54b of the first and second retainers 48, 50 and is less than the thickness of the portion of the body 32 of the second connector 14 (i.e. the distance between its faces 34, 36) that the channel 52 is configured to receive such that the retainers 48, 50 can be biased against that portion of the second connector 14.

As with the first biasing member 16, the second biasing member 18 may also be carried by either the first connector 12 or the second connector 14. In the embodiment illustrated in, for example, FIG. 3, the second biasing member 18 is carried by the first connector 12 and extends outwardly from the second face 26 of the body 22 thereof, in the particular embodiment shown in the drawings. The second biasing member 18 includes at least one resilient engagement portion 62 that is configured to engage and be biased against one of the sidewalls 40a, 40b of the slot 38 in the body 32 of the second connector 14 when a portion of the body 22 of the first connector 14 is inserted into the slot 38. Which sidewall 40a, 40b the second biasing member 18 engages is dependent upon the orientation of the first and second connectors 14, 16, but in the illustrated embodiment the second biasing member 18 is engaged with and biased against the sidewall 40b. In any event, the combined thickness of the portion of the body 22 that is inserted into the slot 38 and the second biasing member 18 is greater than the distance between the first and second slot sidewalls 40a, 40b such that the second biasing member 18 is engaged with one of the sidewalls 40a, 40b. In the embodiment illustrated in FIGS. 3 and 4, the second biasing member 18 includes one engagement portion 62; though it will be appreciated that in other embodiments more than one second biasing member 18 may be provided, if desired, to provide multiple engagement portions 62 spaced apart to provide multiple biasing points of contact with the other connector. For example, in the embodiment illustrated in FIGS. 7 and 10, the first connector 12 may include a pair of biasing members 18a, 18b that provide corresponding engagement portions 62a, 62b.

Regardless of the number of engagement portions 62 the second biasing member(s) 18 may have, that or those engagement portions may have a number of shapes and configurations. In the illustrated embodiment, at least part of the second biasing member 18 overlies and/or is defined by a void 59 formed in the first connector body 22, which may be spaced from the void 57 adjacent to the first and third biasing members 16, 55. Thus, at least a portion of the second biasing member 18 is not directly coupled to the second face 26 of the body 22 and is somewhat free to flex or move relative to the face 26. In the illustrated embodiment, the engagement portion 62 is radiused or outwardly curved or bowed relative to the face 26 from which it extends so as to allow a certain type and amount of relative movement between the first and second components 20, 30 and the first and second connectors 12, 14 when the first and second connectors 12, 14 are mated together. Further, in at least some implementations, the second biasing member 18 may be laterally positioned between the retainers 48, 50, but arranged on the opposite face 26 from the retainers (which extend from the first face 24). It will be appreciated, however, that other or additional suitable shapes and configurations may be used instead.

As briefly described above, the first and second connectors 12, 14 are mated together to couple individual components associated therewith. To do so, the channel 52 formed between the first and second retainers 48, 50 of the first biasing member 16 carried by the first connector 12, and the portion of the second connector 14 to be inserted into the channel 52 are aligned with each other, as shown in FIG. 1. The second biasing member 18 carried by the first connector 12 and the slot 38 in the body 32 of the second connector 14 are also aligned. In an embodiment such as that illustrated in FIGS. 7 and 10 wherein the second connector 14 includes guides 28a, 28b the guides and a portion of the body 32 of the second connector 14 are also aligned with each other. Once the various components have been appropriately aligned, force is applied to the first connector 12 and/or the second connector 14 to slidably mate the first and second connectors 12, 14 together as shown in FIGS. 2 and 4-6. When the connectors 12, 14 are mated together, the biasing members 16 and 18 are flexed against their respective adjacent surfaces (also flexed is the third biasing member 55 in the example shown in FIGS. 1-6, and the biasing members 16a, 16b and 55a, 55b In the example shown in FIGS. 7-10).

In any event, as the first and second faces 34, 36 of the second connector 14 and the first biasing member 16 and third biasing member 55 come into contact with each other, the biasing members 16 and 55 are resiliently flexed away from each other and are then biased against the first and second faces 34, 36, respectively. Similarly, as one of the sidewalls 40a, 40b of the slot 38 in the body 32 of the second connector 14 and the second biasing member 18 come into contact with each other, the second biasing member 18 is resiliently flexed away from the slot sidewall and is then biased against it.

Figure 5:
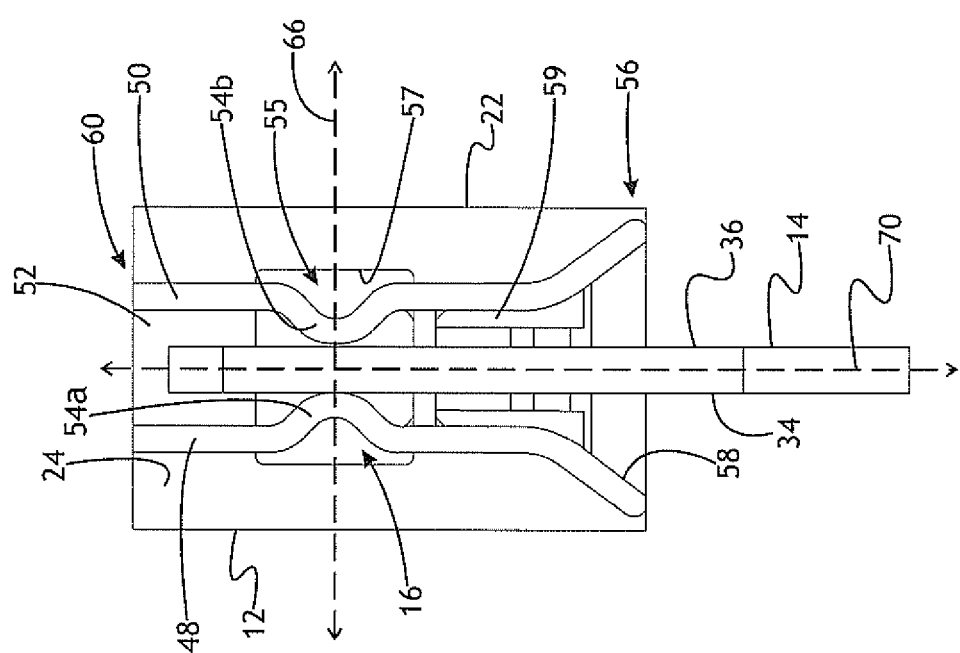
FIG. 5 is a front view of the assembly illustrated in FIGS. 2 and 4.

As shown in, for example, FIG. 5, when the first and second connectors 12, 14 are mated together, the first and second connectors 12, 14 are biased in a first direction 66 (i.e., along a first axis) by the first biasing member 16 thereby constraining relative movement between the first and second connectors 12, 14 in the first direction, and are biased in the opposite direction by the third biasing member 55 (along the same first axis). In some embodiments, constraining the relative movement means that all relative movement is prevented. In other embodiments, however, constraining the relative movement means that some relative movement is permitted but the type and/or amount of movement is limited by the biasing members 16, 55.

Figure 6:
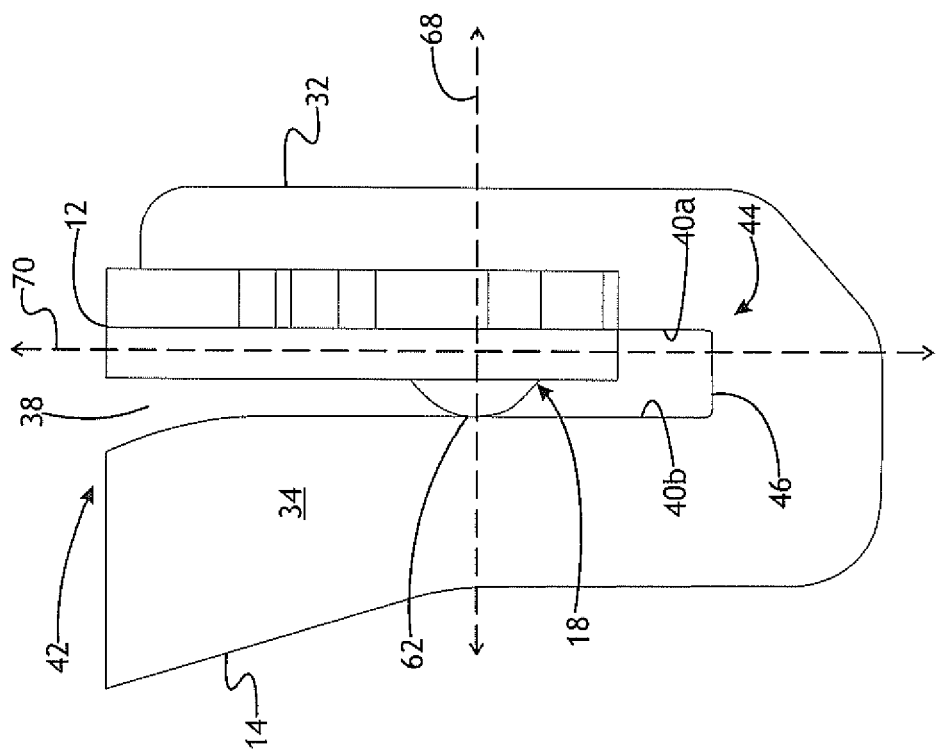
FIG. 6 is a side view of the assembly illustrated in FIGS. 2 and 4.

Similarly, as shown in, for example, FIG. 6, when the first and second connectors 12, 14 are mated together, the first and second connectors are biased in a second direction 68 (i.e., along a second axis) by the second biasing member 18 thereby constraining relative movement between the first and second connectors 12, 14 in the second direction. As with the constraining of relative movement in the first direction 66 described above, in some embodiments constraining the relative movement means that all relative movement is prevented. In other embodiments, however, constraining the relative movement means that some relative movement is permitted but the type and/or amount of movement is limited by the second biasing member 18.

In an illustrative embodiment, the first and second directions 66, 68 are oriented at a non-zero angle relative to each other such that they are not parallel to each other. And in at least some embodiments, the first and second directions 66, 68 are substantially perpendicular to each other. For purposes of this disclosure, "substantially perpendicular" means exactly perpendicular or within a predetermined number of degrees of perpendicular. For example, in some embodiments, "substantially perpendicular" includes instances where the first and second directions 66, 68 are oriented at an angle that is within 0-30° of perpendicular, and in certain embodiments, at an angle that is within 0-15° of perpendicular. It will be appreciated, however, that "substantially perpendicular" may include any suitable angle or range of angles of perpendicular, and thus, the present disclosure is not intended to be limited to any particular angle or range of angles.

While the relative movement between the first and second connectors 12, 14 is constrained in the first and second directions 66, 68 when the first and second connectors 12, 14 are mated together, the first and second connectors 12, 14 are relatively slidable in a third direction 70 (i.e., along a third axis) that is different than both the first and second directions. For example, in the embodiment illustrated in, for example, FIGS. 5 and 6, relative movement between the first and second connectors 12, 14 in the direction 70 within and along the length of the slot 38 is permitted. In an embodiment, the third direction 70 is oriented at non-zero angles relative to the first and second directions 66, 68 such that it is not parallel to either of the first and second directions 66, 68. And in at least some embodiments, the third direction 70 is substantially perpendicular to each of the first and second directions 66, 68, which, as described above, encompasses both exactly perpendicular or within a predetermined number of degrees of perpendicular (e.g., 0-30°).

While the description above has been primarily with respect to an embodiment wherein the biasing members 16, 18 are both carried by the first connector 14, and, in particular, the first face 24 and second face 26 thereof, respectively, in other embodiments one or both of the biasing members (e.g., biasing members 16, 18, 55, etc.) may be carried by the second connector 14.

For example, in the embodiment shown in FIG. 11, the first biasing member 16' Is carried by the second connector 14, and a third biasing member 55' also is carded by the second connector. In this embodiment, the first biasing member 16' extends outwardly and away from the first face 34 of the body 32 of the second connector 14 in a first direction, and the third biasing member 55' extends outwardly and away from the second face 36 of the body 32 in a second direction that is opposite the first direction. In such an embodiment, the first connector 12 would include a feature (not shown), for example, a channel, that is configured to receive the portion of the second connector 14 carrying the first and third biasing members 16', 55' against which the first and third biasing members 16', 55' would be biased. This feature would have a width that is less than the combined width of the portion of the second connector 14 to be inserted therein and the first and third biasing member 16', 55' such that the biasing members are biased against interior opposing sidewalls of the feature when the first and second connectors 12, 14 are mated together.

In the embodiment shown in FIG. 12, the second biasing member 18' is carried by the second connector 14. In this embodiment, the second biasing member 18' extends outwardly from one of the sidewalls 40a, 40b (sidewall 40b in FIG. 12) of the slot 38 in the body 32 of the second connector 14 and towards the other of the sidewalls 40a, 40b (sidewall 40a In FIG. 12). In such an embodiment, the minimum width of the slot 38 or distance between the second biasing member 18' and the opposing sidewall of the slot 38 is less than the thickness of the portion of the body 22 of the first connector 12 that is to be inserted into the slot 38 such that the second biasing member 18' Is biased against the one of the faces 24, 26 of the first connector 12 when the first and second connectors 12, 14 are mated together. As with the embodiments described elsewhere above, it will be appreciated that in at least some embodiments, the second connector 14 may carry more than one biasing member 18', and thus, the present disclosure is not meant to be limited to any particular number of biasing members 18'.

Accordingly, it will be appreciated that the biasing members 16, 18 may be arranged in multiple ways (e.g., both biasing members may be carried by the same connector, or each connector may carry a respective one of the biasing members). As such, the present disclosure is not intended to be limited to any particular arrangement(s).

What is claimed is:

1. An assembly for coupling a first component with a second component, comprising:
    a first connector associated with the first component and having a body that includes a first face and a second face, and a second connector associated with the second component and configured to be mated with the first connector, the second connector having a body that includes a first face, a second face, and a slot disposed therein extending through the first and second faces and configured to receive at least a portion of the body of the first connector, the slot having first and second spaced-apart sidewalls; and
    a first biasing member carried by the first connector or the second connector, and a second biasing member carried by the first connector or the second connector, the first biasing member and second biasing member being flexible and resilient;
    wherein when the first and second connectors are mated together:
        the first biasing member is resiliently flexed against an adjacent surface and the first and second connectors are biased in a first direction by the first biasing member thereby constraining relative movement between the first and second connectors in the first direction;
        the second biasing member is resiliently flexed against an adjacent surface and the first and second connectors are biased in a second direction by the second biasing member thereby constraining relative movement between the first and second connectors in the second direction, wherein the second direction is oriented at a non-zero angle relative to the first direction, and
        the first and second connectors are relatively slidable in a third direction different from the first and second directions.

2. The assembly of claim 1, wherein the first biasing member is carried by and is movable relative to the first face of the body of the first connector.

3. The assembly of claim 1, wherein the second biasing member is carried by and is movable relative to the first connector and extends outwardly from the second face of the body of the first connector.

4. The assembly of claim 1, wherein first biasing member is carried by the second connector and extends outwardly from the first face of the body of the second connector and a third biasing member extends outwardly from the second face of the body of the second connector.

5. The assembly of claim 1, wherein the second biasing member is carried by the second connector and extends into the slot in the body of the second connector from one of the first and second sidewalls of the slot.

6. The assembly of claim 1, which also comprises a third biasing member arranged oppositely to the first biasing member, and when the first and second connectors are mated together, the first biasing member is engaged with and resiliently flexed against the first face of the second connector and the third biasing member is engaged with and resiliently flexed against the second face of the second connector.

7. The assembly of claim 6, wherein multiple first and third biasing members are provided with each configured to engage the first face or second face of the second connector.

8. The assembly of claim 6, wherein at least one of the first and third biasing members comprises at least one radiused engagement portion that is configured to engage the first face or second face of the second connector.

9. The assembly of claim 1, wherein the second biasing member comprises at least one radiused portion.

10. The assembly of claim 1, wherein the first direction in which the first and second connectors are biased is substantially perpendicular to the second direction in which the first and second connectors are biased.

11. An assembly for coupling a first component with a second component, comprising:
    a first connector associated with the first component and having a body that includes a first face and a second face, and a second connector associated with the second component and configured to be mated with the first connector, the second connector having a body that includes a first face, a second face, and a slot disposed therein extending through the first and second faces and configured to receive at least a portion of the body of the first connector, the slot having first and second spaced-apart sidewalls; and a first biasing member carried by the first connector or the second connector, the first biasing member being flexible and resilient and having an engagement portion movable relative to the body of the first connector or the second connector, and a second biasing member carried by the first connector or the second connector the second biasing member being flexible and resilient and having an engagement portion movable relative to the body of the first connector or the second connector, wherein when the first and second connectors are mated together:

the engagement portion of the first biasing member engages an adjacent surface and a biasing force is applied to the first and second connectors in a first direction by the first biasing member thereby constraining relative movement between the first and second connectors in the first direction; the engagement portion of the second biasing member engages an adjacent surface and a biasing force is applied to the first and second connectors in a second direction by the second biasing member thereby constraining relative movement between the first and second connectors in the second direction, wherein the second direction is substantially perpendicular to the first direction; and the first and second connectors are relatively slidable in a third direction that is substantially perpendicular to both the first direction and the second direction.

12. The assembly of claim 11, wherein the slot in the body of the second connector has an open end and a closed end remote from the open end and defined by a base extending between the first and second sidewalls of the slot.

13. The assembly of claim 11, wherein the first biasing member is carried by the first face of the body of the first connector, and when the first and second connectors are mated together, the first biasing member is engaged with and provides a biasing force on the first face of the second connector and a third biasing member carried by the first face of the body of the first connector is engaged with and provides a biasing force on the second face of the second connector.

14. The assembly of claim 13, wherein multiple first and third biasing members are provided on the first connector.

15. The assembly of claim 13, wherein at least one of the first and third biasing members comprise at least one radiused engagement portion that is configured to engage the first face or the second face of the second connector.

16. The assembly of claim 11, wherein the second biasing member comprises at least one radiused portion.

17. The assembly of claim 11, wherein the second biasing member is carried by the first connector and extends outwardly from the second face of the body of the first connector.

18. The assembly of claim 11, wherein the first biasing member is carried by the first face of the body of the first connector, and the second biasing member is carried by the first connector and extends outwardly from the second face of the body of the first connector.

19. The assembly of claim 11, wherein the second biasing member is carried by the second connector and extends into the slot in the body of the second connector from one of the first and second sidewalls of the slot.

20. The assembly of claim 11, wherein the first biasing member is carried by the second connector and extends outwardly from the first face of the body of the second connector and a third biasing member is carried by the second connector and extends outwardly from the second face of the body of the second connector.

* * * * *